(12) United States Patent
Duer et al.

(10) Patent No.: US 10,538,438 B2
(45) Date of Patent: Jan. 21, 2020

(54) TANK OVERFLOW PIPE ADJUSTABLE DECHLORINATING DEVICE

(71) Applicant: Red Valve Company, Inc., Carnegie, PA (US)

(72) Inventors: Michael J. Duer, Zelienople, PA (US); Paul E. Handke, Venetia, PA (US)

(73) Assignee: Red Valve Company, Inc., Pittsburgh, PA (US)

( * ) Notice: Subject to any disclaimer, the term of this patent is extended or adjusted under 35 U.S.C. 154(b) by 282 days.

(21) Appl. No.: 15/198,352

(22) Filed: Jun. 30, 2016

(65) Prior Publication Data

US 2017/0001892 A1    Jan. 5, 2017

Related U.S. Application Data (60) Provisional application No. 62/186,863, filed on Jun. 30, 2015.

(51) Int. Cl.
| | |
|---|---|
| *B01F 1/00* | (2006.01) |
| *C02F 1/68* | (2006.01) |
| *C02F 1/70* | (2006.01) |
| *B01F 5/06* | (2006.01) |
| *C02F 101/12* | (2006.01) |

(52) U.S. Cl.
CPC ............ *C02F 1/687* (2013.01); *B01F 5/0603* (2013.01); *C02F 1/688* (2013.01); *C02F 1/70* (2013.01); *B01F 1/0033* (2013.01); *B01F 2001/0061* (2013.01); *C02F 2101/12* (2013.01); *C02F 2201/005* (2013.01)

(58) Field of Classification Search
CPC ........ C02F 1/687; C02F 1/70; C02F 2101/12; C02F 2201/005; C02F 2303/185; C02F 1/688; B01F 1/0027; B01F 1/0033; B01F 2001/0055; B01F 2001/0061

See application file for complete search history.

(56) References Cited

U.S. PATENT DOCUMENTS

| | | | | |
|---|---|---|---|---|
| 6,221,257 B1 * | 4/2001 | Grim | ......................... | C02F 1/70 210/155 |
| 6,294,096 B1 * | 9/2001 | Pate | ...................... | B01F 1/0027 210/198.1 |
| 6,298,871 B1 * | 10/2001 | Pickens | ................. | B01F 1/0027 137/268 |
| 9,272,928 B2 | 3/2016 | Blanusa | | |
| 2008/0087587 A1 * | 4/2008 | Burrows | ................. | C02F 9/005 210/86 |
| 2011/0094949 A1 * | 4/2011 | Just | ......................... | C02F 1/688 210/85 |
| 2012/0037570 A1 * | 2/2012 | Blanusa | ................ | B01F 1/0027 210/739 |

* cited by examiner

*Primary Examiner* — Lucas A Stelling
(74) *Attorney, Agent, or Firm* — The Webb Law Firm (57) ABSTRACT

A dechlorinating device includes a mixing chamber having an inlet and an outlet, and the dechlorinating device is configured to receive a fluid. The dechlorinating device also includes a dechlorinating conduit disposed within the mixing chamber and a recirculation zone disposed within the mixing chamber and positioned between the dechlorinating conduit and the outlet. A dechlorinating system includes a storage tank, an overflow pipe in fluid communication with the storage tank, and the dechlorinating device in fluid communication with the overflow pipe. A method of dechlorinating includes providing the dechlorinating device and feeding the fluid to the inlet of the dechlorinating device.

21 Claims, 5 Drawing Sheets

TANK OVERFLOW PIPE ADJUSTABLE DECHLORINATING DEVICE

CROSS REFERENCE TO RELATED APPLICATIONS

This application claims the benefit of U.S. Provisional Application No. 62/186,863, filed on Jun. 30, 2015, the disclosure of which is hereby incorporated in its entirety by reference.

BACKGROUND OF THE INVENTION

Field of the Invention

The present invention relates to a dechlorinating device, a dechlorinating system, and a method of dechlorinating.

Description of Related Art

Public water systems (PWS) either treat or purchase water that has been treated to remove contaminants and pathogens deemed a public health hazard. Part of the treatment process is to disinfect the water with a chemical known to kill pathogens, such as chlorine and chloramine, a compound of chlorine and ammonia. PWS distribute potable (drinking) water to customers through a piping network distribution system. Most PWS must also maintain a disinfectant residual in the water in order to fight off any pathogens that could contaminate the water once it is in the distribution system. Water storage tanks are a component of the distribution system and each typically hold thousands or millions of gallons of water. The purpose of the storage tanks is to store excess water to feed water to the distribution system in periods of high usage, to provide water in times of emergency and fires, and to provide water to the system in times of power outage when pumps are out of service.

Storage tanks may contain one or more overflow pipes that discharge water out of the tank in the event the tank continues to fill beyond the "high water level" for which it was designed. This overflow prevents structural damage to the tank walls and roof that would occur if the tank continued to fill above the design limit.

While some overflow pipes discharge to the ground, others discharge into a stormwater collection system. All stormwater eventually gets discharged into a natural body of water including lakes, ponds, streams, rivers, and oceans. The disinfectant, chlorine for example, that is dissolved in the water is toxic and, therefore, can be harmful to aquatic life. As such, many regulatory agencies require that any potable water with a disinfectant residual that will be discharged into a stormwater system must have the disinfectant removed (e.g., dechlorinated) to prevent harm to aquatic life. Failure to do so can result in significant fines until the issue is corrected. To date, there has not been a reliable device that can be installed on overflow pipes to automatically remove the disinfectant (e.g., dechlorinate) from discharged water and to be non-clog in nature. Thus, there is a need for a reliable device that can be installed on overflow pipes to automatically remove the disinfectant (e.g., dechlorinate) from discharged water and to be non-clog in nature.

Following the terrorist attacks of Sep. 11, 2001, the United States Congress passed the Public Health Security and Bioterrorism Preparedness and Response Act of 2002 (Bioterrorism Act). The Bioterrorism Act "requires community drinking water systems serving populations of more than 3,300 persons to conduct assessments of their vulnerabilities to terrorist attack or other intentional acts and to defend against adversarial actions that might substantially disrupt the ability of a system to provide a safe and reliable supply of drinking water." One of the areas identified in the vulnerability assessments as a potential area of terrorist attack was storage tank overflow pipes whereby a terrorist could inject a dangerous or lethal liquid or gas into the overflow pipe that would then enter and contaminate the drinking water contained in the water storage tank. As such, there is also a need for an apparatus that could provide a layer of protection or security against such an attempt.

SUMMARY OF THE INVENTION

In one embodiment, a dechlorinating device includes a mixing chamber having an inlet and an outlet and is configured to receive a fluid. The dechlorinating device also includes a dechlorinating conduit disposed within the mixing chamber and a recirculation zone disposed within the mixing chamber and positioned between the dechlorinating conduit and the outlet.

The dechlorinating device may include an inlet duckbill valve positioned at the inlet. The dechlorinating device may include an outlet duckbill valve positioned at the outlet. The dechlorinating device may include both an inlet duckbill valve positioned at the inlet and an outlet duckbill valve positioned at the outlet.

The dechlorinating device may include a conduit fixed to the mixing chamber. The dechlorinating conduit may include an outer conduit fixed to the mixing chamber and an inner conduit disposed within the outer conduit and in fluid communication with the outer conduit. The dechlorinating conduit may include an outer conduit fixed to the mixing chamber and an inner conduit disposed within the outer conduit and in fluid communication with the outer conduit and a conduit screen disposed within the inner conduit and in fluid communication with the inner conduit. The outer conduit may include a plurality of openings. The inner conduit may include a circumference and a plurality of rows, each row having a opening, where the rows are arranged about the circumference. The plurality of rows may include a first row and a second row, with the opening of the first row having a different size compared to the opening of the second row. The inner conduit may be rotatable relative to the outer conduit. A dechlorinating material may be disposed within the dechlorinating conduit. An end cap may be coupled to the dechlorinating conduit and be removable from the dechlorinating conduit. An inner conduit position rod may be configured to co-act with the inner conduit to prevent the inner conduit from rotating during operation of the dechlorinating device. A hopper may be connected to the conduit screen, the hopper configured to feed dechlorinating material within the conduit screen using gravity. The dechlorinating material may include ascorbic acid, sodium sulfite, sodium bisulfite, sodium ascorbate, sodium metabisulfite, or calcium thiosulfate.

The recirculation zone may include a blending trough. The blending trough may be a curved plate having a cross-section that is a semi-circle. The blending trough may be a planar plate. The blending trough may include a drain hole.

In another embodiment, a dechlorinating system includes a storage tank configured to hold a fluid and an overflow pipe in fluid communication with the storage tank. The dechlorinating system includes a dechlorinating device that includes a mixing chamber having an inlet and an outlet and configured to receive a fluid. The dechlorinating device also includes a dechlorinating conduit disposed within the mixing chamber and a recirculation zone disposed within the mixing chamber and positioned between the dechlorinating conduit and the outlet. The dechlorinating device is in fluid communication with the overflow pipe.

In another embodiment, a method of dechlorinating includes the step of providing a dechlorinating device that includes a mixing chamber having an inlet and an outlet and is configured to receive a fluid. The dechlorinating device also includes a dechlorinating conduit disposed within the mixing chamber and a recirculation zone disposed within the mixing chamber and positioned between the dechlorinating conduit and the outlet. The method also includes the step of feeding the fluid to the inlet.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

For purposes of the description hereinafter, the terms "upper", "lower", "right", "left", "vertical", "horizontal", "top", "bottom", "lateral", "longitudinal", "proximal", "distal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
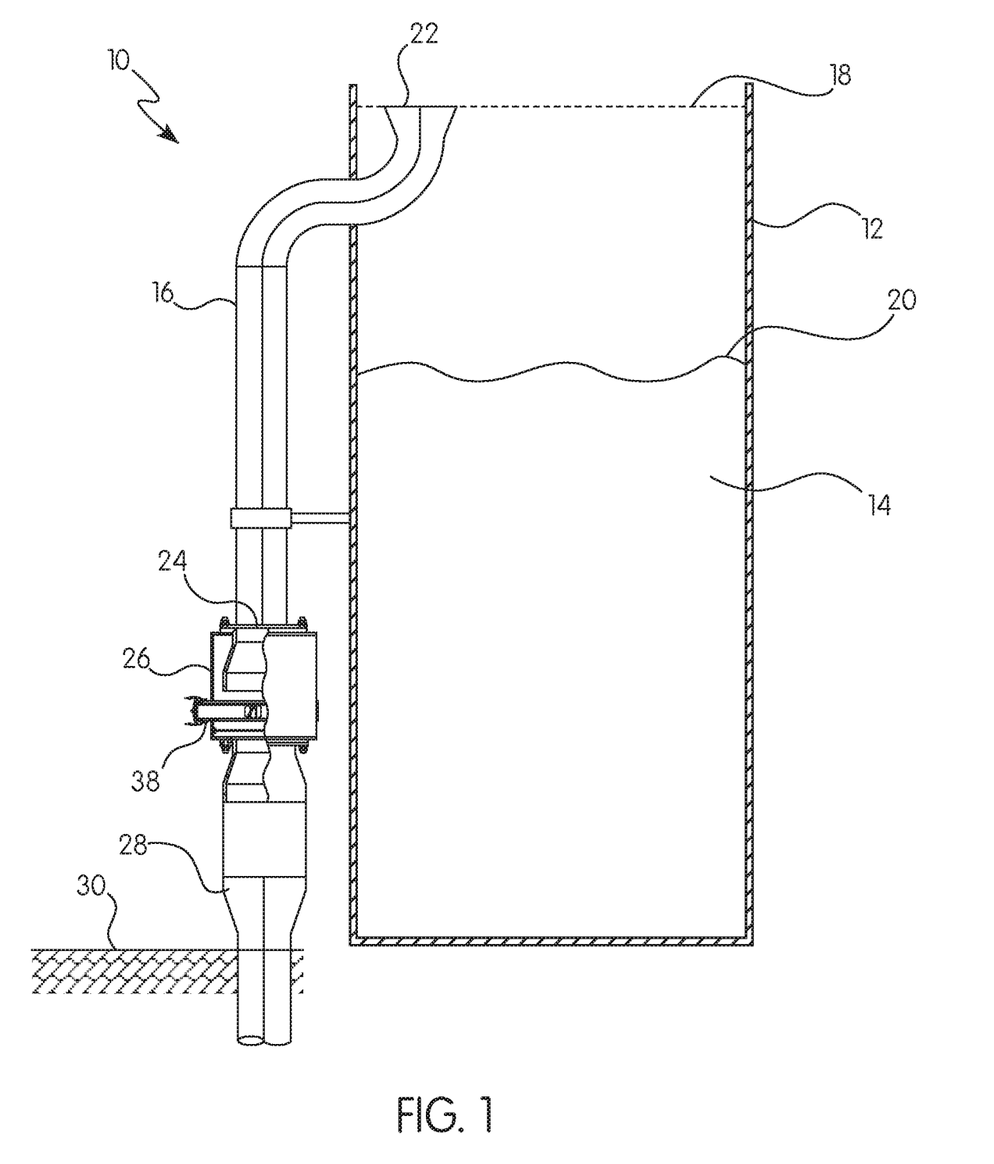
FIG. 1 shows a perspective view of a dechlorinating system including a dechlorinating device having a portion cut away installed on an overflow pipe according to the present invention.

Referring to FIG. 1, a dechlorinating system (10) may include a storage tank (12) that holds a fluid (14), such as a gas (14) or liquid (14) (such as and referred to interchangeably herein as water (14) or potable water (14)). The dechlorinating system (10) may be used, for instance, to dechlorinate water (14) in a public water system. The fluid (14) may be water (14) treated to remove contaminants and pathogens using chlorine or chloramine to make potable water (14). The dechlorinating system (10) may also include an overflow pipe (16) in fluid communication with the storage tank (12). The storage tank (12) may include a fill line (18), which is a maximum height of a fluid level (20) above which structural damage may begin to occur on the storage tank (12). Therefore, it is recommended that the fluid level (20) in the storage tank (12) remain at or below the fill line (18). The overflow pipe (16) may include a first end (22) and a second end (24). The first end (22) may be in fluid communication with the storage tank (12) and may be positioned at the fill line (18) to allow excess fluid (14) (i.e., the fluid (14) over the fill line (18)) to flow through the overflow pipe (16). Thus, when the fluid level (20) in the storage tank (12) is at or below the fill line (18), the fluid (14) does not enter the first end (22) of the overflow pipe (16), but when the fluid level (20) rises above the fill line (18), excess fluid (14) flows into the first end (22) of the overflow pipe (16) in order to drop the fluid level (20) back to the fill line (18).

With continued reference to FIG. 1, the dechlorinating system (10) may also include a dechlorinating device (26) in fluid communication with the second end (24) of the overflow pipe (16) to dechlorinate excess fluid (14) flowing out of the storage tank (12) and through the overflow pipe (16). The dechlorinating device (26) may remove (e.g., dechlorinate) disinfectant, such as chlorine or chloramine, added to the fluid (14), for instance, to make potable drinking water (14), and the fluid (14) may be dechlorinated using the dechlorinating device (26) such that the fluid (14) has a disinfectant/chlorine level permissible to eventually be discharged into a natural waterbody including lakes, ponds, streams, rivers, and oceans. In some embodiments, the fluid (14) exiting the dechlorinating device (26) flows through additional piping (28) and into the ground (30) or a subgrade storm water drainage piping system.

It is to be understood that while FIG. 1 shows the fluid (14) flowing vertically from the storage tank (12) to the dechlorinating device (26) through the overflow pipe (16), that in other arrangements the storage tank (12) and the dechlorinating device (26) may be arranged such that the fluid (14) flows horizontally or at any other angle through the overflow pipe (16) from the storage tank (12) to the dechlorinating device (26).

Figure 2:
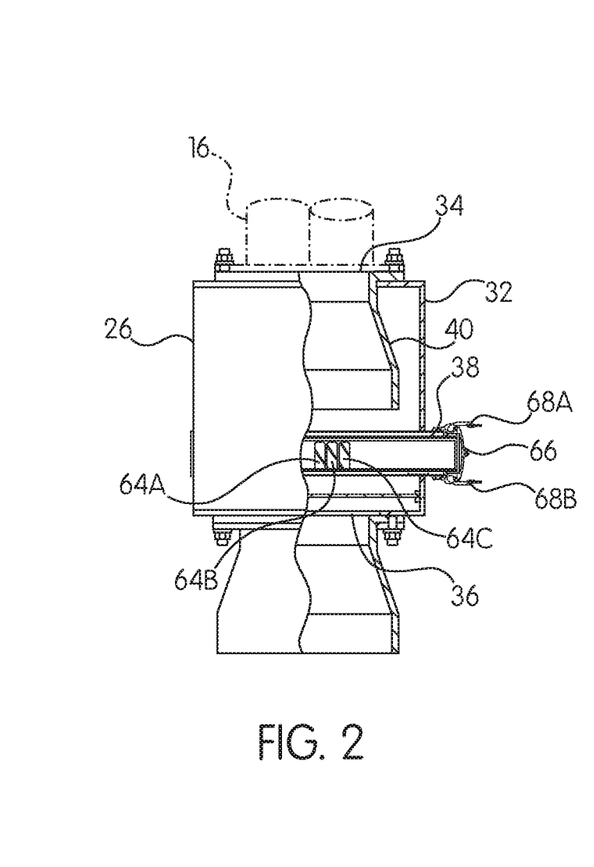
FIG. 2 shows an enlarged elevation side view of the dechlorinating device having a portion cut away according to the present invention.
Figure 3:
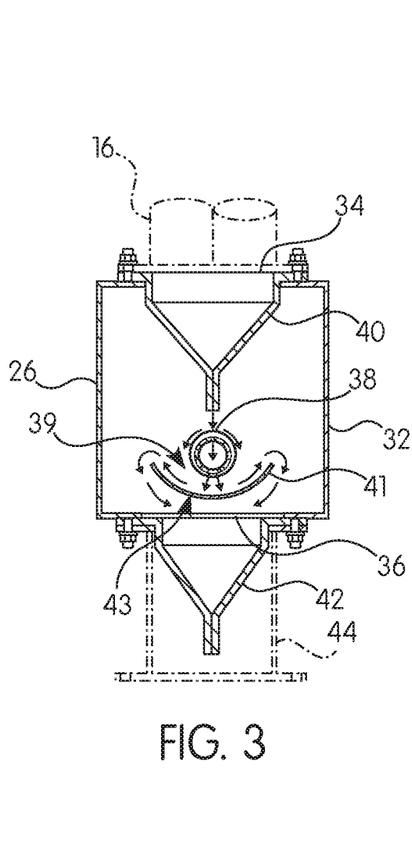
FIG. 3 shows a cross-sectional view of the front of the dechlorinating device shown in FIG. 2.

Referring to FIGS. 2 and 3, the dechlorinating device (26) may include a mixing chamber (32) having an inlet (34) and an outlet (36) and configured to receive the fluid (14). The mixing chamber (32) may be any shape, such as having the rectangular cross-section of FIG. 3, a square cross-section, a triangular cross-section, or a cross-section of any other polygon. The mixing chamber (32) may be spherical or cylindrical. A dechlorinating conduit (38) may be disposed within the mixing chamber (32). A recirculation zone (39) may also be disposed within the mixing chamber (32), and the recirculation zone (39) may be positioned between the dechlorinating conduit (38) and the outlet (36) to deflect fluid (14) flowing from the inlet (34) and/or the dechlorinating conduit (38) so that the fluid (14) that has flowed through the dechlorinating conduit (38) mixes with the fluid (14) that has entered the mixing chamber (32) through the inlet (34) but has not flowed through the dechlorinating conduit (38). The recirculation zone (39) may include a blending trough (41), and the blending trough (41) may be included with at least one drain hole (43) which may allow some fluid (14) to drain therethrough. In some embodiments, the blending trough (41) may be a curved plate having a cross-section that is a semi-circle (see FIG. 3). In other embodiments, the blending trough (41) may be a planar plate. The blending trough (41) may be any shape sufficient to deflect fluid (14) flowing from the inlet (34) and/or the dechlorinating conduit (38) so that the fluid (14) that has flowed through the dechlorinating conduit (38) mixes with the fluid (14) that has entered the mixing chamber (32) through the inlet (34) but has not flowed through the dechlorinating conduit (38). It is further noted that, in some embodiments, the dechlorinating device (26) may include more than one dechlorinating conduit (38), recirculation zone (39), and/or blending trough (41).

With continued reference to FIGS. 2 and 3, the fluid (14) may leave the dechlorinating device (26) by flowing out the outlet (36). A outlet pipe spool (44) may be positioned at the outlet (36) to carry the fluid (14) away from the dechlorinating device (26). The outlet pipe spool (44) may not be included in some embodiments, but the outlet pipe spool (44) may be used where the dechlorinating device (26) is to be installed "inline" with the overflow piping (16) and additional piping (28) on the outlet (36) end of the dechlorinating device (26), as shown in FIG. 1.

Still referring to FIGS. 2 and 3, the dechlorinating device (26) may include duckbill valves (40, 42), which are one-way flow valves. These one-way flow valves (40, 42) prevent birds, insects, rodents, and airborne pathogens from entering the storage tank (12). An inlet duckbill valve (40) may be positioned at the inlet (34) of the mixing chamber (32). An outlet duckbill valve (42) may be positioned at the outlet (36) of the mixing chamber (32). In some embodiments, the dechlorinating device (26) includes both an inlet duckbill valve (40) and an outlet duckbill valve (42). In other embodiments, the dechlorinating device (26) may include either an inlet duckbill valve (40) or an outlet duckbill valve (42). In still other embodiments, the dechlorinating device (26) may be designed without inlet and outlet duckbill valves (40, 42).

Non-limiting examples of suitable duckbill valves (40, 42) include those commercially available from Tideflex and Red Valve Company, Inc. The duckbill valves (40, 42) may be made of rubber. The duckbill valves (40, 42) may be mounted to the mixing chamber (32), which is typically made of metal or plastic. The inlet duckbill valve (40) may be mounted to the mixing chamber (32) at the inlet (34) such that a portion of the inlet duckbill valve (40) is positioned inside the mixing chamber (32) (see FIG. 3). The outlet duckbill valve (42) may be mounted to the mixing chamber (32) at the outlet (36) such that a portion of the outlet duckbill valve (42) is positioned outside the mixing chamber (32), such as in the outlet pipe spool (44) (see FIG. 3).

A dual duckbill valve (40, 42) configuration (including both an inlet duckbill valve (40) and an outlet duckbill valve (42)) may provide a redundant dual check that provides added security to mitigate intentional contamination of the fluid (14) in the tank (12) from a terrorist attack. In areas where there is little potential threat of terrorism, the outlet duckbill valve (42) may be excluded from the dechlorinating device (26). The inlet duckbill valve (40) may discharge an elliptically-shaped jet of fluid (14), which is a favorable geometry for discharging the flow of fluid (14) onto the dechlorinating conduit (38).

Referring to FIGS. 4-7, the dechlorinating conduit (38) may include an outer conduit (46), for instance shaped as an outer tube (46), an inner conduit (48), for instance shaped as an inner tube (48), and a conduit screen (50) containing perforations, for instance shaped as a cylindrical conduit screen (50) containing perforations. The outer conduit (46), inner conduit (48), and conduit screen (50) need not be tubes or cylinders, but may be any-shaped conduits. The inner conduit (48) may be in fluid communication with the outer conduit (46). The inner conduit (48) may be made of metal or plastic. The conduit screen (50) may be in fluid communication with the inner conduit (48) and disposed within the inner conduit (48).

Figure 4:
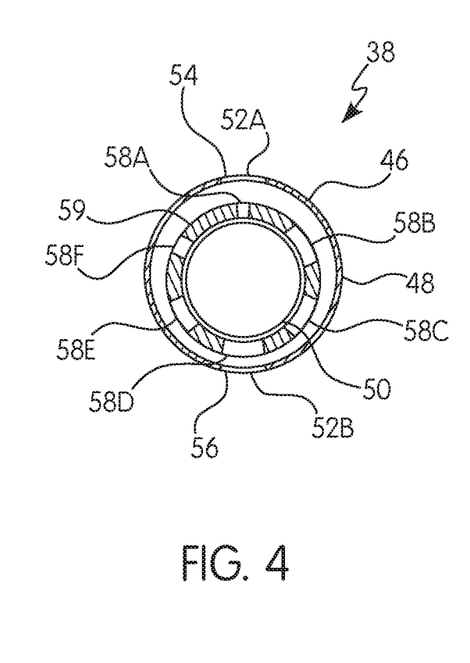
FIG. 4 shows an enlarged cross-sectional view of a front of a dechlorinating conduit of the dechlorinating device shown in FIG. 2.
Figure 5:
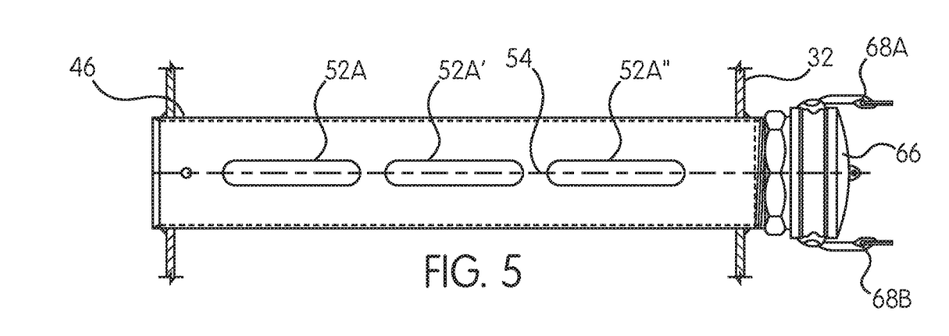
FIG. 5 shows a top view of a dechlorinating conduit of the dechlorinating device according to the present invention.

The outer conduit (46) may be fixed to the mixing chamber (32) and may include a plurality of openings (52A, 52A', 52A", 52B). The outer conduit (46) may also include an inlet end (54) and an outlet end (56), with the inlet end (54) positioned on the side of the outer conduit (46) closer to the inlet (34) of the mixing chamber (32). The outlet end (56) may be positioned on the side of the outer conduit (46) closer to the outlet (36) of the mixing chamber (32). As shown in FIG. 4, the opening (52A) may be included at the inlet end (54), and the opening (52B) may also be included at the outlet end (56). These openings (52A, 52B) may be on exact opposite ends of the outer conduit (46) or may be spaced apart in any other arrangement about the outer conduit (46). As shown in FIG. 5, an end (54, 56) of the outer conduit (46) may include multiple openings (52A, 52A', 52A"), such as multiple openings (52A, 52A', 52A") on the inlet end (54). The openings (52A, 52A', 52A", 52B) of the outer conduit (46) may allow the fluid (14) to enter and exit the dechlorinating conduit (38).

With continued reference to FIGS. 4-7, the inner conduit (48) may be disposed within the outer conduit (46). The inner conduit (48) may include openings (58A, 58A', 58A", 58A''', 58A'''', 58B, 58B', 58B", 58B''', 58B'''', 58C, 58D, 58E, 58F). The inner conduit (48) may be an inner tube (48) and include a circumference (59) that has a plurality of rows (60A, 60B) arranged around the circumference (59), with each row having at least one opening (58A, 58A', 58A", 58A''', 58A'''', 58B, 58B', 58B", 58B''', 58B'''') (see FIG. 7). For instance, the inner tube (48) may include a first row (60A) and a second row (60B) with the first row (60A) including at least one opening (58A, 58A', 58A", 58A''', 58A'''') and the second row (60B) including at least one opening (58B, 58B', 58B", 58B''', 58B''''). The openings (58A, 58A', 58A", 58A''', 58A'''') of the first row (60A) may be of a different size and/or shape compared to the openings (58B, 58B', 58B", 58B''', 58B'''') of the second row (60B).

Still referring to FIGS. 4-7, the inner conduit (48) may be rotatable relative to the outer conduit (46), and the inner conduit (48) may be rotated using any sufficient arrangement. Rotation of the inner conduit (48) may be performed to align openings (58A, 58A', 58A", 58A''', 58A'''', 58B, 58B", 58B''', 58B'''', 58B 58C, 58D, 58E, 58F) of the inner conduit (48) with openings (52A, 52A', 52A", 52B) of the outer conduit (46). For instance, openings (58A, 58A', 58A", 58A''', 58A'''') of the first row (60A) of the inner conduit (48) from FIG. 7 may be aligned with the openings (52A, 52A', 52A") of the outer conduit (46) positioned at the inlet end (54) from FIG. 5. The inner conduit (48) may then be rotated such that the openings (58B, 58B', 58B", 58B'", 58B"") of the second row (60B) of the inner conduit (48) from FIG. 7 may be aligned with the openings (52A, 52A', 52A") of the outer conduit (46) positioned at the inlet end (54) from FIG. 5. Since the openings (58B, 58B', 58B", 58B'", 58B"") of the second row (60B) of the inner conduit (48) are larger than the openings (58A, 58A', 58A", 58A'", 58A"") of the first row (60A) of the inner conduit (48), more fluid (14) flowing through the dechlorinating conduit (38) may flow through the inner conduit (48) (as opposed to flowing around the outside of the inner conduit (48)) and into the conduit screen (50). Therefore, the inner conduit (48) may be rotated so that the openings (58A, 58A', 58A", 58A'", 58A"", 58B, 58B', 58B", 58B'", 58B"", 58C, 58D, 58E, 58F) of the inner conduit (48) having a specific size are selectively aligned with the openings (52A, 52A', 52A") of the outer conduit (46) positioned at the inlet end (54) so that the desired amount of fluid (14) flows to the conduit screen (50) (providing for adjustability of the dechlorinating conduit (38)).

FIG. 4 shows an embodiment of the inner conduit (48) having openings (58A, 58B, 58C, 58D, 58E, and 58F) of varying size. In this embodiment, the openings (58B, 58C, 58D) are of the same size and are drain openings (58B, 58C, 58D) having a size larger than that of the openings (58A, 58E, 58F). In this embodiment, the opening (58A) of the inner conduit (48) may be aligned with the opening (52A) of the outer conduit (46) to provide the lowest flow of fluid (14) to the conduit screen (50), where the fluid (14) enters the inner conduit (48) through the opening (58A) and exits the inner conduit (48) through the opposing drain opening (58D). The inner conduit (48) may be rotated to align the opening (58F) of the inner conduit (48) with the opening (52A) of the outer conduit (46) to allow more fluid (14) (a medium flow) to flow into the conduit screen (50), where the fluid (14) enters the inner conduit (48) through the opening (58F) and exits the inner conduit (48) through the opposing drain opening (58C). The inner conduit may be rotated again to align the opening (58E) of the inner conduit (48) with the opening (52A) of the outer conduit (46) to allow even more fluid (14) (a highest flow) to flow into the conduit screen (50), where the fluid (14) enters the inner conduit (48) through the opening (58E) and exits the inner conduit (48) through the opposing drain opening (58B). The inner conduit may be rotated again to align one of the drain openings (58B, 58C, 58D) of the inner conduit with the opening (52A) of the outer conduit (46) to allow all, or substantially all, of the fluid (14) flowing into the dechlorinating conduit (38) to flow into the conduit screen (50) and exit the inner conduit (48) through the opposing openings (58E, 58F, 58A). More or fewer openings (58A, 58B, 58C, 58D, 58E, and 58F) of varying sizes may be included in the inner conduit (48) compared to the embodiment shown in FIG. 4 depending on the desired capability of the inner conduit (48) to adjustably alter the flow rate of fluid (14) flowing into the conduit screen (50).

Figure 6:
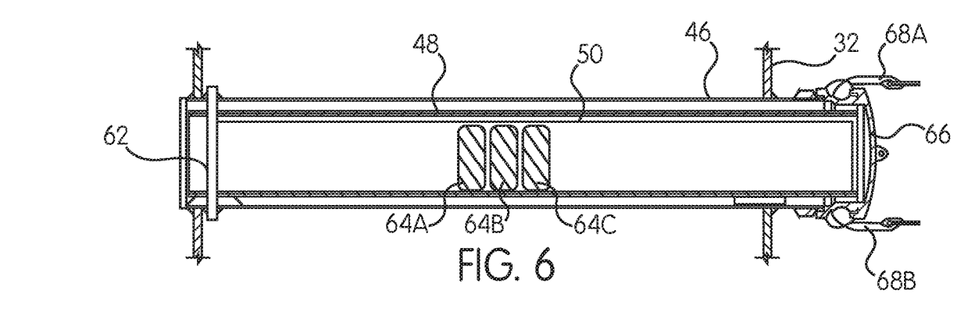
FIG. 6 shows a cross-sectional top view of the dechlorinating conduit of the dechlorinating device shown in FIG. 5.
Figure 7:
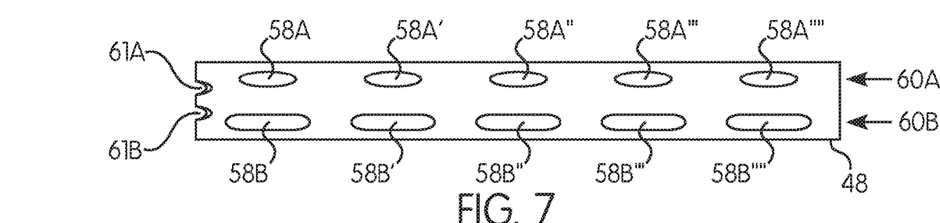
FIG. 7 shows of an inner conduit according to the present invention.
Figure 8:
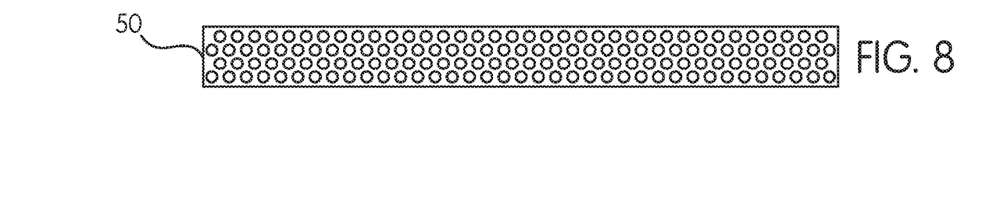
FIG. 8 shows a conduit screen according to the present invention.

Referring to FIGS. 6 and 7, the inner conduit (48) may be rotatable relative to the outer conduit (46), but, at times, the inner conduit (48) may be fixed relative to the outer conduit (46), such as during operation of the dechlorinating device (26). The inner conduit (48) may be fixed relative to the outer conduit (46) during operation of the dechlorinating device (26) using an inner conduit position rod (62), which co-acts with the inner conduit (48) to fix the inner conduit (48) relative to the outer conduit (46) during operation of the dechlorinating device (26). In one embodiment, the inner conduit (48) includes at least one notch (61A, 61B) to co-act with the inner conduit position rod (62) (see FIG. 7). The inner conduit position rod (62) may fit in the notch (61A, 61B) of the inner conduit (48). The inner conduit position rod (62) in this embodiment allows for rotation of the inner conduit (48) relative to the outer conduit (46) at times, but also allows for the inner conduit (48) to be fixed relative to the outer conduit (46) at other times. By way of example, the inner conduit position rod (62) may first fit into the notch (61A) to fix the inner conduit (48) relative to the outer conduit (46). The inner conduit (48) may then be translated, rotated, and translated back in the opposite direction such that the inner conduit position rod (62) now fits into the notch (61B) to again fix the inner conduit (48) relative to the outer conduit (46) in a new position. This configuration of the inner conduit position rod (62) is merely one example, and the inner conduit position rod (62) may prohibit the inner conduit (48) from rotating during operation of the dechlorinating device (26) using any other suitable arrangement.

With continued reference to FIG. 6, the conduit screen (50) may be disposed within the inner conduit (48) and may include a dechlorinating material (64A, 64B, 64C), such as in the form of dechlorinating tablets (64A, 64B, 64C) (see FIG. 6). The dechlorinating material (64A, 64B, 64C) may be in any other suitable form other than tablets, such as dechlorinating granules, dechlorinating rods, dechlorinating cubes, dechlorinating sheets, etc. The dechlorinating material (64A, 64B, 64C) may be disposed inside the conduit screen (50) to prevent rapid dissolution/consumption. The dechlorinating material (64A, 64B, 64C) may include chemicals that are dissolvable in water (14) and that may remove the disinfectants (e.g., chlorine) from water (14) when the dechlorinating material (64A, 64B, 64C) is dissolved (or otherwise consumed) in water (14). For instance, the dechlorinating material (64A, 64B, 64C) may include ascorbic acid, sodium sulfite, sodium bisulfite, sodium ascorbate, sodium metabisulfite, calcium thiosulfate, or any other chemical sufficient to strip chlorine and other disinfectants from the water (14). The rate of dissolution of the dechlorinating material (64A, 64B, 64C) may change based on the size of the openings (58A, 58A', 58A", 58A'", 58A"", 58B, 58B', 58B", 58B'", 58B"", 58C, 58D, 58E, 58F) of the inner conduit (48) aligned with the openings (52A, 52A', 52A") of the outer conduit (46) because larger openings allow more fluid (14) to reach the dechlorinating material (64A, 64B, 64C), causing the dechlorinating material (64A, 64B, 64C) to dissolve faster. Thus, the adjustability of the dechlorinating conduit (38) can selectively change the rate at which the dechlorinating material (64A, 64B, 64C) is dissolved. Other factors may affect the rate at which the dechlorinating material (64A, 64B, 64C) dissolves, such as the environment in which the dechlorinating device (26) is located. In some embodiments, the dual duckbill valve (40, 42) configuration previously described may be used to provide a favorable environment to prolong the life of the dechlorinating material (64A, 64B, 64C) exposed to humidity. In other embodiments, an outlet duckbill valve (42) may not be included when the dechlorinating device (26) is located in favorable climates that would not prematurely dissolve the dechlorinating material (64A, 64B, 64C). In some embodiments, the duckbill valves (40, 42) are made out of a whiter rubber, such that the rubber will reflect light and minimize heat gain, which preserves the life of the dechlorinating material (64A, 64B, 64C).

Referring back to FIG. 3, one configuration is shown of the dechlorinating device (26). In this embodiment, the dechlorinating conduit (38) is positioned between the inlet (34) and the outlet (36) proximate the exit of the inlet duckbill valve (40). The recirculation zone (39) (including the blending trough (41)) is positioned between the dechlorinating conduit (38) and the outlet (36). In this embodiment, the blending trough (41) is a curved plate that has a cross-section that is a semi-circle. The embodiment of the dechlorinating device (26) in FIG. 3 allows the fluid (14) (not shown), such as chlorinated public water (14) or water (14) containing some other disinfectant, to enter through the inlet (34). The water (14) may flow through the inlet (34) and the inlet duckbill valve (40), and the water (14) may leave the inlet duckbill valve (40) in an elliptically-shaped jet. Some of that water (14) may pass through the dechlorinating conduit (38) and come into contact with the dechlorinating material (64A, 64B, 64C) (not shown) and then leave the dechlorinating conduit (38) via the opening (52B) on the outlet end (56). Some of the water (14) may not pass through the dechlorinating conduit (38), but may deflect around the outside of the dechlorinating conduit (38). Only some of the water (14) needs to come into contact with the dechlorinating material (64A, 64B, 64C). The water (14) that deflects around the dechlorinating conduit (38) and the water (14) that passes through the dechlorinating conduit (38) may mix in the recirculation zone (39), for instance by providing the blending trough (41). The blending trough (41) may deflect the dechlorinated water (14) that passed through the dechlorinating conduit (38) and the still chlorinated water (14) that passed around the dechlorinating conduit (38), causing all of the water (14) to mix in the recirculation zone (39). Some of the water (14) may flow through the blending trough (41) via the drain holes (43) in the blending trough (41). The mixed water (14), having an acceptable reduced concentration of chlorine or other disinfectant, may then exit the dechlorinating device (26) via the outlet (36). The arrows in FIG. 3 show the flow path of the water (14) through the dechlorinating device (26) in this embodiment.

Additionally, the configuration shown in FIG. 3 of the dechlorinating device (26) aides in preventing clogs. Debris and other objects (e.g., leaves) may get into water storage tanks (12), which could get clogged in prior art overflow pipes (16) (e.g., such as in screens or meshes in prior art overflow pipes used to keep out birds, rodents, etc.). The dechlorinating device (26), according to the present invention, may prevent clogging by including a flow path around the dechlorinating conduit (38) (see FIG. 3) that is sufficiently large to prevent debris and other objects from getting clogged in the dechlorinating device (26).

Referring back to FIG. 4, it is noted that the dechlorinating conduit (38) shown in FIG. 4 may be modified to still effectively strip chlorine and/or other disinfectants from the fluid (14). For instance, the dechlorinating conduit (38) may be included with only the outer conduit (46) having the dechlorinating material (64A, 64B, 64C) (not shown) disposed within the outer conduit (46) (i.e., without the inner conduit (48) and the conduit screen (50)). In another embodiment, the dechlorinating conduit (38) may be included with an inner conduit (48) disposed within the outer conduit (46) and with the dechlorinating material (64A, 64B, 64C) disposed within the inner conduit (48) (i.e., without the conduit screen (50)).

Referring back to FIGS. 5 and 6, the dechlorinating conduit (38) may be configured such that the inner conduit (48) is removable from the outer conduit (46). Additionally, the conduit screen (50) may also be removable from the outer conduit (46). An end cap (66) may be provided that is coupled to the outer conduit (46). The end cap (66) may be removably coupled to the outer conduit (46) such that the end cap (66) can be quickly removed from the outer conduit (46). This coupling of the end cap (66) to the outer conduit (46) can be done by any sufficient means. In one embodiment, the end cap (66) is removable using a snap lock configuration. In this configuration, snap locks (68A, 68B) co-act with the end cap (66) to lock the end cap (66) onto the outer conduit (46). Rotating the snap locks (68A, 68B) engages/disengages the end cap (66) to allow the end cap (66) be placed on and removed from the outer conduit (46). This snap lock configuration is only one potential configuration for removably attaching the end cap (66) and the outer conduit (46). Once the end cap (66) is removed, the inner conduit (48) and/or the conduit screen (50) can be inserted or removed from the outer conduit (46).

Figure 9:
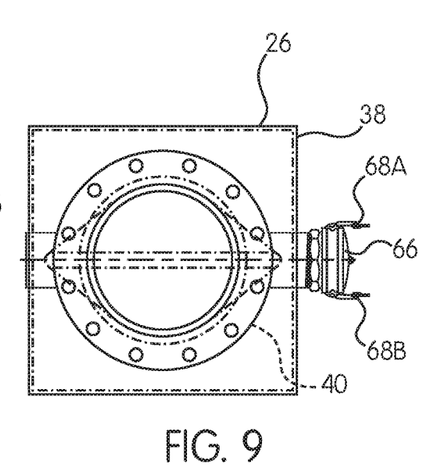
FIG. 9 shows an inlet duckbill valve associated with the dechlorinating conduit with an overflow pipe not shown for clarity according to the present invention.

FIG. 9 shows an embodiment of the inlet duckbill valve (40) associated with the dechlorinating conduit (38). In FIG. 9, the overflow pipe (16) is not shown in order to clearly show installation of the inlet duckbill valve (40) on the dechlorinating device (26).

Figure 10:
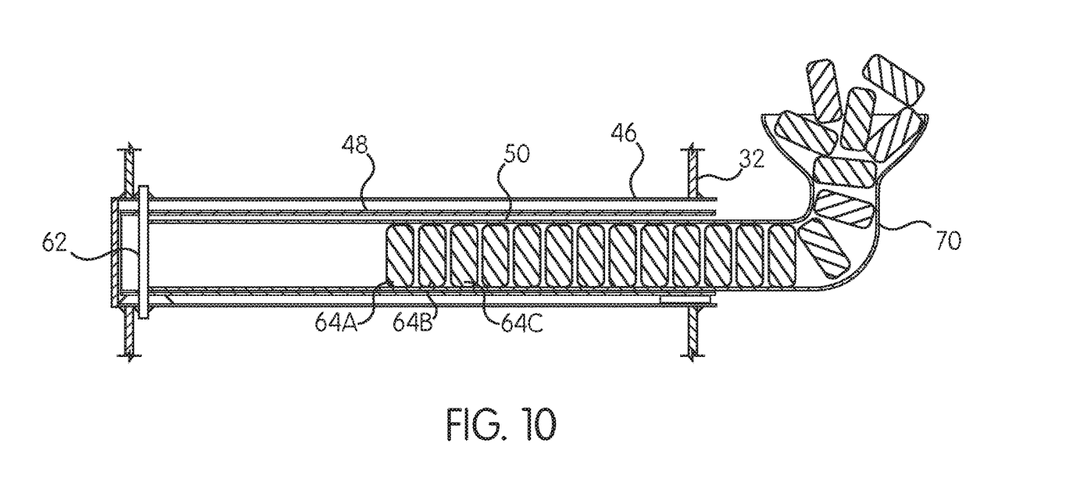
FIG. 10 shows an elevation side view of a dechlorinating conduit having a hopper connected to a conduit screen according to the present invention.

Referring to FIG. 10, in one embodiment, the dechlorinating material (64A, 64B, 64C) may be fed inside the conduit screen (50) using gravity. This may be done by connecting a hopper (70) filled with dechlorinating material (64A, 64B, 64C) to the conduit screen (50). As the dechlorinating material (64A, 64B, 64C) in the conduit screen (50) is dissolved, gravity may force dechlorinating material (64A, 64B, 64C) queued in the hopper (70) into the conduit screen (50) to replace the dissolved dechlorinating material (64A, 64B, 64C). In this embodiment, no end cap (66) is disposed on the end of the outer conduit (46)

Figure 11:
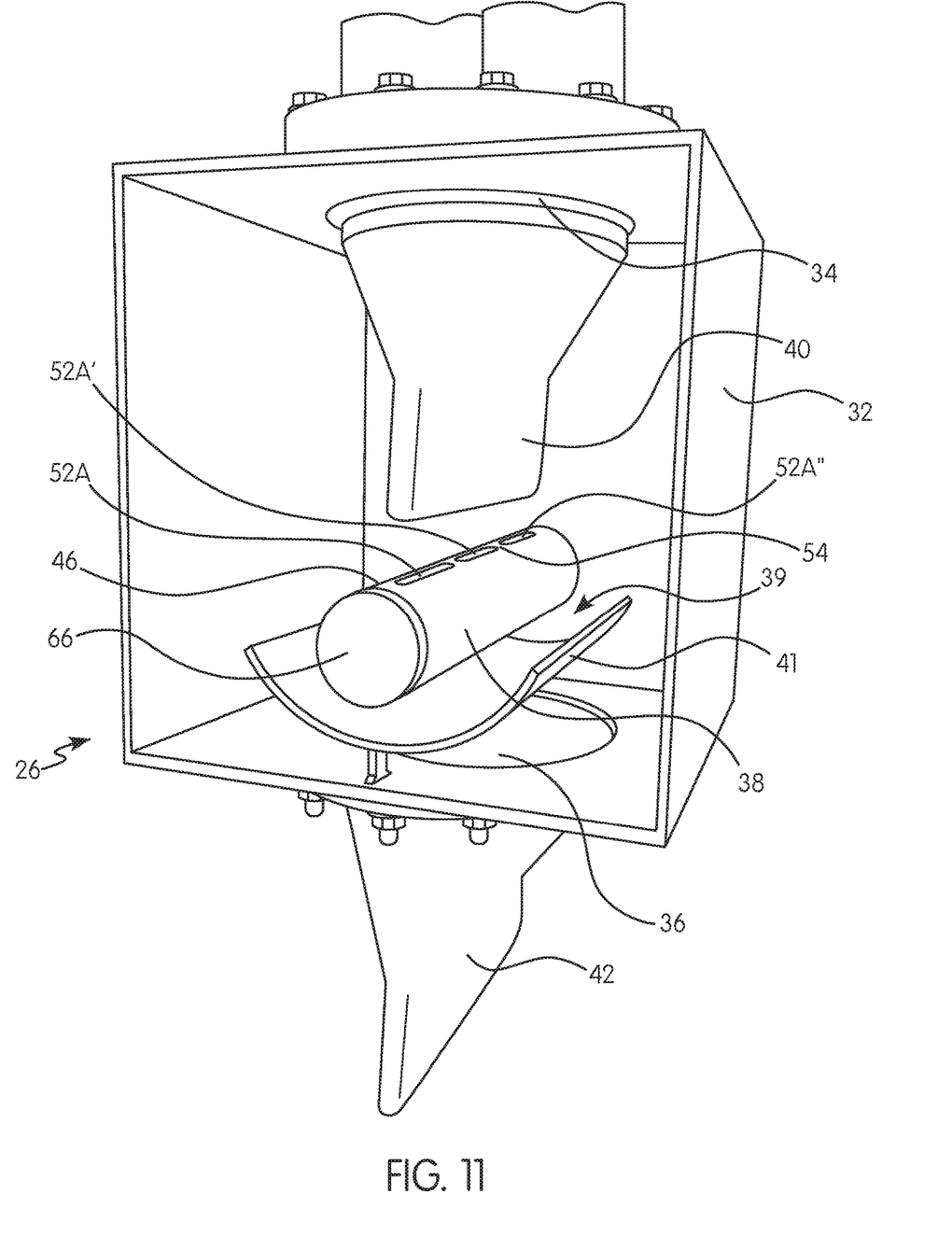
FIG. 11 shows a perspective view of a dechlorinating device according to the present invention.

Referring to FIG. 11, a perspective view of the dechlorinating device (26) isolated from the dechlorinating system (10) is shown. This embodiment includes a mixing chamber (32) having a rectangular cross-section and the dual duckbill valve (40, 42) configuration. The dechlorinating conduit (38) includes an outer chamber (46) having three openings (52A, 52A', 52A") proximate the inlet duckbill valve (40). The end cap (66) at the end of the conduit (46) does not include the snap lock configuration, but instead removably fits over the end of the outer conduit (46). The blending trough (41) in this embodiment has a cross-section that is a semi-circle, and the blending trough (41) is positioned between the dechlorinating conduit (38) and the outlet (36).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:
1. A dechlorinating device comprising:
  a mixing chamber comprising an inlet and an outlet and configured to receive a fluid;
  a dechlorinating conduit disposed within the mixing chamber; and
  a zone disposed within the mixing chamber and positioned between the dechlorinating conduit and the outlet where fluid flowing from the inlet and/or the dechlorinating conduit is deflected such that the fluid mixes with fluid that has already entered the mixing chamber but has not flowed through the dechlorinating conduit, wherein the dechlorinating conduit comprises: an outer conduit fixed to the mixing chamber, the outer conduit comprising a plurality of openings positioned on one or more sides of the outer conduit; and an inner conduit disposed within the outer conduit and which is in fluid communication with the outer conduit, wherein the inner conduit comprises a circumference, and a plurality of rows, each row comprising an opening, wherein the rows are arranged about the circumference, and wherein the zone comprises a blending component that is positioned above the outlet of the mixing chamber and below the dechlorinating conduit, and wherein the blending component extends along a length of the dechlorinating conduit such that a longitudinal axis of the blending component is parallel to a longitudinal axis of the dechlorinating conduit and one side of the blending component faces one side of the outer conduit.

2. The dechlorinating device according to claim 1, further comprising an inlet duckbill valve positioned at the inlet.

3. The dechlorinating device according to claim 2, further comprising an outlet duckbill valve positioned at the outlet.

4. The dechlorinating device according to claim 1, further comprising an outlet duckbill valve positioned at the outlet.

5. The dechlorinating device according to claim 1, wherein the dechlorinating conduit comprises a conduit fixed to the mixing chamber.

6. The dechlorinating device according to claim 1, wherein the dechlorinating conduit further comprises:
a conduit screen disposed within the inner conduit and in fluid communication with the inner conduit.

7. The dechlorinating device according to claim 6, further comprising a hopper connected to the conduit screen, the hopper configured to feed dechlorinating material within the conduit screen using gravity.

8. The dechlorinating device according to claim 1, wherein the plurality of rows comprises a first row and a second row, wherein the opening of the first row has a different size compared to the opening of the second row.

9. The dechlorinating device according to claim 1, wherein the inner conduit is rotatable relative to the outer conduit.

10. The dechlorinating device according to claim 9, further comprising an inner conduit position rod configured to co-act with the inner conduit to prevent the inner conduit from rotating during operation of the dechlorinating device.

11. The dechlorinating device according to claim 1, further comprising a dechlorinating material disposed within the dechlorinating conduit.

12. The dechlorinating device according to claim 11, wherein the dechlorinating material comprises ascorbic acid, sodium sulfite, sodium bisulfite, sodium ascorbate, sodium metabisulfite, or calcium thiosulfate.

13. The dechlorinating device according to claim 1, comprising an end cap coupled to the dechlorinating conduit and configured to be removable from the dechlorinating conduit.

14. The dechlorinating device according to claim 1, wherein the blending component is a blending trough.

15. The dechlorinating device according to claim 14, wherein the blending trough is a curved plate having a cross-section that is a semi-circle.

16. The dechlorinating device according to claim 14, wherein the blending trough comprises a planar plate.

17. The dechlorinating device according to claim 14, wherein the blending trough comprises a drain hole.

18. A dechlorinating system comprising:
a storage tank configured to hold a fluid;
an overflow pipe in fluid communication with the storage tank; and
a dechlorinating device according to claim 1 in fluid communication with the overflow pipe.

19. A method of dechlorinating comprising:
providing a dechlorinating device according to claim 1; and
feeding the fluid to the inlet.

20. A dechlorinating device comprising:
a mixing chamber comprising an inlet and an outlet and configured to receive a fluid;
a dechlorinating conduit disposed within the mixing chamber, wherein the dechlorinating conduit comprises: an outer conduit fixed to the mixing chamber, the outer conduit comprising a plurality of openings positioned on one or more sides of the outer conduit; and an inner conduit disposed within the outer conduit and which is in fluid communication with the outer conduit; and
a zone disposed within the mixing chamber and positioned between the dechlorinating conduit and the outlet where fluid flowing from the inlet and/or the dechlorinating conduit is deflected such that the fluid mixes with fluid that has already entered the mixing chamber but has not flowed through the dechlorinating conduit, wherein the inner conduit is rotatable relative to the outer conduit and wherein dechlorinating device further comprises an inner conduit position rod configured to co-act with the inner conduit to prevent the inner conduit from rotating during operation of the dechlorinating device.

21. A dechlorinating device comprising:
a mixing chamber comprising an inlet and an outlet and configured to receive a fluid;
a dechlorinating conduit disposed within the mixing chamber, wherein the dechlorinating conduit comprises: (i) an outer conduit fixed to the mixing chamber, the outer conduit comprising a plurality of openings positioned on one or more sides of the outer conduit; (ii) an inner conduit disposed within the outer conduit and which is in fluid communication with the outer conduit; and (iii) a conduit screen disposed within the inner conduit and in fluid communication with the inner conduit;
a zone disposed within the mixing chamber and positioned between the dechlorinating conduit and the outlet where fluid flowing from the inlet and/or the dechlorinating conduit is deflected such that the fluid mixes with fluid that has already entered the mixing chamber but has not flowed through the dechlorinating conduit; and
a hopper connected to the conduit screen, the hopper configured to feed dechlorinating material within the conduit screen using gravity.

* * * * *